(No Model.)

D. WHITLOCK.
ATTACHMENT FOR BLADES OF ROTARY FANS.

No. 411,312. Patented Sept. 17, 1889.

Attest:
L. Lee.
F. C. Fischer.

Inventor,
D. Whitlock, per
Crane & Miller, Attys.

UNITED STATES PATENT OFFICE.

DANIEL WHITLOCK, OF NEWARK, NEW JERSEY.

ATTACHMENT FOR BLADES OF ROTARY FANS.

SPECIFICATION forming part of Letters Patent No. 411,312, dated September 17, 1889.

Application filed July 31, 1888. Serial No. 281,508. (No model.)

*To all whom it may concern:*

Be it known that I, DANIEL WHITLOCK, a citizen of the United States, residing at Newark, Essex county, New Jersey, have invented certain new and useful Improvements in Attachments for Blades of Rotary Fans, fully described and represented in the following specification and the accompanying drawings, forming a part of the same.

The object of this invention is to fasten the blades of rotary fans more securely in the revolving hub which carries the same, and also in some cases to limit the inclination of the blade by a stop upon its shank.

The invention will be understood in the annexed drawings, in which—

Figure 1:
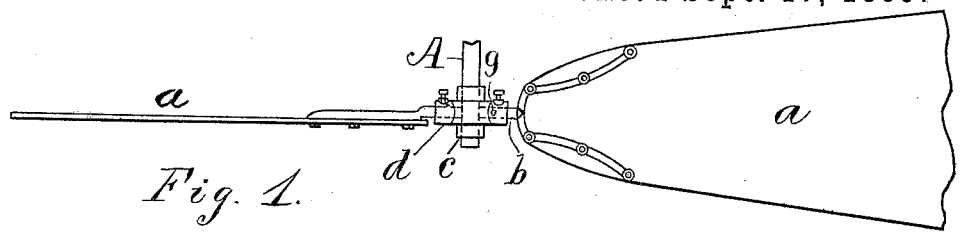
Figures 2, 4:
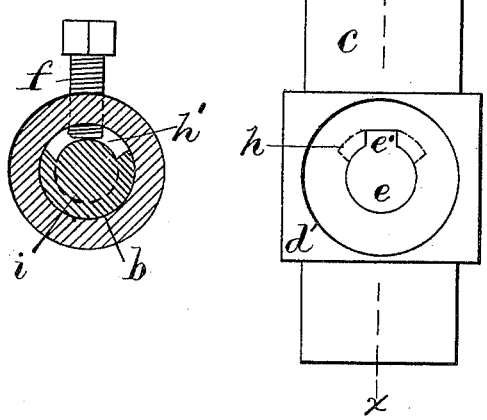
Figure 5:
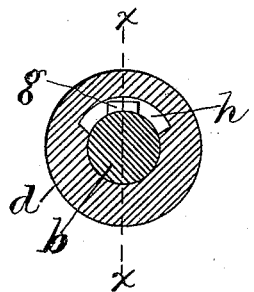
Figure 3:
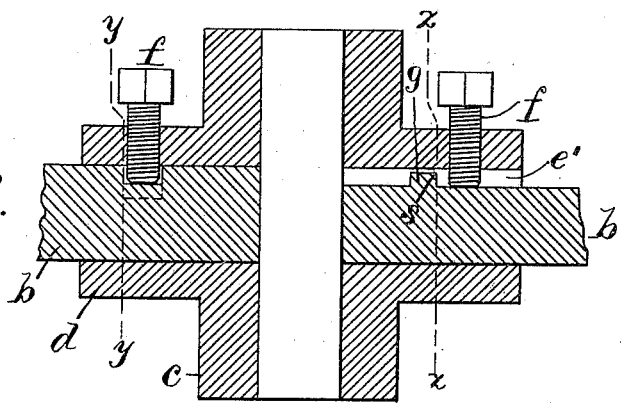

Figure 1 represents the hub of the fan with the lower end of its rotating shaft and two blades attached thereto, with their outer ends broken off. In this figure the hub is shown in side elevation with two bosses to receive the shanks of the fan-blades; and Fig. 2 shows a view of such hub at the end of one of the bosses. Fig. 3 is a section of the hub on line $x$ $x$ in Fig. 2. Fig. 4 is a section of one of the bosses on line $y$ $y$ in Fig. 3, and Fig. 5 is a section of one of the bosses on line $z$ $z$ in Fig. 3.

A is the rotary fan-shaft; $a$, the fan-blades; $b$, the shank attached thereto for connecting it with the hub.

$c$ is the hub, which may be secured upon the shaft A in any desired manner, and $d$ the bosses upon the same, provided with sockets $e$ to receive the shanks $b$. Heretofore the shanks have been screwed into such sockets, but were then liable to turn in the socket and to assume some other than the desired angle. The shanks have also been held in the socket by a set-screw, and when the set-screw would become loose by the vibration of the fan-blades the entire blade would become detached and become thrown out by the rotary movement.

My invention provides a means of limiting the arc or angle through which the shank can be turned in the socket, and at the same time prevents the shank from flying out of the socket if the clamping set-screw becomes loosened. Such means consists in forming a shoulder upon the shank $b$ and inserting a set-screw $f$ through the hub in front of such shoulder, the point of the screw thus bearing against the side of the shoulder for a considerable distance and preventing the withdrawal of the shank except the set-screw be retracted the entire height of the shoulder, which would require several complete rotations of the set-screw. The shoulder may be formed by providing a stud $g$ upon the shank, as shown in Figs. 1, 3, and 5, the front side of the stud forming the desired shoulder $s$ and fitting behind the set-screw when inserted in the socket $e$. To admit the stud into the socket, a groove $e'$ would be formed at one side of the socket, as shown in Fig. 2, and the stud may serve to restrict the turning of the shank, and of the fan-blade attached thereto, by forming a recess $h$ of sector shape in the rear part of the socket, as shown in dotted lines in Fig. 2, and more fully in the section in Fig. 5, where the shank and stud are shown within the socket and recess. The stud, when checked by the ends of the recess, forms the desired stop and prevents the turning of the shank in the desired manner.

The shoulder may be formed by making an annular groove in the shank, as indicated by the dotted line $i$ in Fig. 4, in which case the shank could turn all the way around in the socket if the set-screw became loosened, but could not fly out of the socket without retracting the set-screw to wholly escape the shoulder $s$ formed by the rear side of the socket. The annular groove may also be extended only part way around the shank, as shown in the full lines in Fig. 4, and indicated at the left side of Fig. 3, the groove then forming a recess $h'$, similar in shape to the recess $h$, and the ends of the groove serving as stops when brought against the sides of the set-screw to limit the angular movement or adjustment of the fan-blade.

I am aware that it is common to fit a pin or set-screw in a groove to form a swivel-joint; but in my construction no swivel-joint is desired, and the set-screw is clamped firmly upon the shank when the device is in use, the shoulder $s$ being adapted only to operate in case of accident to prevent the sliding of the shank outward in its socket. My invention thus provides a means of rigidly securing the shank in the socket at any required angle, while it prevents the accidental dislodgment of the shank from the socket if the fastening device becomes loosened, and when required it also provides a means of limiting the angular movement of the blade, so that an inexperienced person cannot set the blade in an undesirable position—as, for instance, at right angles to its path through the air.

At the left side of Fig. 1 the fan-blade is shown in edge view, and if the stud $g$ were then fitted to the groove $e'$ it is obvious that a recess $h$ formed as shown in Fig. 5 would prevent the turning of the blade more than forty or fifty degrees in either direction, and the blade could therefore never be accidentally turned into the position indicated at the right-hand side of Fig. 1, where it is shown merely for purposes of illustration at right angles to its path of rotation around the shaft A.

It will be noticed that the recess $h$ is formed by expanding the rear end of the groove $e'$ in both directions laterally, and that when the stud is turned in either direction into such recess the metal in front of the recess effectually prevents the withdrawing of the shank from the socket independently of the set-screw $f$. Such construction therefore affords a greater security than the other shown herein, in which no stud projects from the shank, as the stud operates positively to retain the shank in the socket so long as the blade is turned in an angular position.

It is obviously immaterial whether the recess of sector shape be formed in the socket, as at $h$, or in the shank, as at $h'$, provided its opposite ends serve as stops, in the manner herein described.

Having thus set forth my invention, what I claim herein is—

The combination, with a rotary fan-shaft, of the hub having the socket $e$, provided with the groove $e'$, extending to the outer end of the socket, the sector-shaped recess connected with the groove in the rear part of the same, the set-screw $f$, inserted through the hub into the groove before the recess, and the fan-blade $a$, having the shank $b$, provided with the stud $g$, fitted to such groove and recess, as and for the purpose set forth.

In testimony whereof I have hereunto set my hand in the presence of two subscribing witnesses.

DANIEL WHITLOCK.

Witnesses:
THOS. S. CRANE,
L. LEE.